US007939156B1

(12) United States Patent
Slaven, Jr. et al.

(10) Patent No.: US 7,939,156 B1

(45) Date of Patent: May 10, 2011

(54) COMPOSITE CONCRETE/BAMBOO STRUCTURE

(76) Inventors: Leland Slaven, Jr., Bradenton, FL (US); Robert Bernhard, Longboat Key, FL (US)

( * ) Notice: Subject to any disclaimer, the term of this patent is extended or adjusted under 35 U.S.C. 154(b) by 185 days.

(21) Appl. No.: 12/489,182

(22) Filed: Jun. 22, 2009

Related U.S. Application Data

(63) Continuation-in-part of application No. 11/707,205, filed on Feb. 13, 2007, now abandoned, which is a continuation-in-part of application No. 11/494,113, filed on Jul. 27, 2006, now abandoned.

(51) Int. Cl.
*B29C 43/18* (2006.01)
*B32B 9/02* (2006.01)

(52) U.S. Cl. ........ 428/107; 428/105; 428/113; 428/114; 428/215; 428/537.1

(58) Field of Classification Search .................. 428/107, 428/105, 113, 114, 215, 528, 537.1
See application file for complete search history.

(56) References Cited

U.S. PATENT DOCUMENTS

| | | | | |
|---|---|---|---|---|
| 4,799,961 | A | 1/1989 | Friberg | |
| 4,985,119 | A | 1/1991 | Vinson et al. | |
| 5,030,289 | A | 7/1991 | Sattler et al. | |
| 5,047,086 | A | 9/1991 | Hayakawa et al. | |
| 5,167,710 | A | 12/1992 | Leroux et al. | |
| 5,196,061 | A | 3/1993 | Thomas et al. | |
| 5,573,348 | A | 11/1996 | Morgan | |
| 5,733,671 | A | 3/1998 | Bayasi | |
| 5,741,589 | A | 4/1998 | Fujii et al. | |
| 6,010,585 | A * | 1/2000 | Fujii et al. | 156/510 |
| 6,773,500 | B1 | 8/2004 | Creamer et al. | |
| 6,872,246 | B2 | 3/2005 | Merkley et al. | |
| 6,875,503 | B1 | 4/2005 | Famy et al. | |
| 6,976,345 | B2 | 12/2005 | Keshmiri | |
| 7,147,745 | B1 | 12/2006 | Slaven, Jr. et al. | |
| 7,172,136 | B2 | 2/2007 | Leon | |
| 7,276,551 | B2 | 10/2007 | Pageau | |
| 2008/0023868 | A1 | 1/2008 | Slaven et al. | |

* cited by examiner

*Primary Examiner* — Brent T O'Hern
(74) *Attorney, Agent, or Firm* — Charles J. Prescott

(57) ABSTRACT

Composite concrete/bamboo structural members and process of manufacture therefor. The bamboo material includes layers formed of bamboo segments which have been dried and glue coated. The segments are substantially free of outer nodes and husk and inner membrane material prior to application of glue. The longitudinal axes of the segments in each layer are generally parallel to one another and are arranged in a mold to surround the surface of a cured concrete core. The layers of segments are heated, compressed and bonded together until the glue cures around the concrete core into a single integral structure. The concrete core is preferably reinforced with steel REBAR rods.

3 Claims, 7 Drawing Sheets

COMPOSITE CONCRETE/BAMBOO STRUCTURE

CROSS-REFERENCE TO RELATED APPLICATIONS

This application is a continuation-in-part of U.S. application Ser. No. 11/707,205, filed Feb. 13, 2007 now abandoned (U.S. Published Application No. US 2008/0023868), which is a continuation-in-part of U.S. application Ser. No. 11/494,113, filed Jul. 27, 2006 (U.S. Published Application No. US 2007/0187025), now abandoned.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to composite structural wood substitutes, and more particularly to a concrete/bamboo composite structure formed of stranded bamboo segments stripped of all epidermis material and formed into layers surrounding a cured concrete core bonded together under high pressure and temperature into a composite concrete and solid bamboo structural product.

2. Description of Related Art

Because we have, as a world community, substantially depleted the original tree growth in our forests with which we were blessed, manufacturers of wood products utilized in the construction industry have had to resort to next-generation tree growth which, in many cases, produces substantially less wood product as they are necessarily cut down well short of full maturity in size.

Composite lumber formed of wood products such as oriented strand board (OSB) as is described in the SBA Structural Board Association U.S. Edition 2005 Manual, has become a popular substitute for solid wood products. By utilizing substantially all of the wood growth of next-generation forests as facilitated by the OSB process, a very substantial composite wood-based product rivaling the strength of solid wood beams is achievable.

Because of its strength and rapid re-growth cycle, another alternative is to turn to bamboo composite products utilized to form composite wood replacement or alternative beam, plywood and structural products. One particularly interesting bamboo wood replacement product is disclosed in Plaehn, in U.S. Pat. No. 5,543,197. This disclosure teaches a composite bamboo beam which includes segments of bamboo stalk, either split or whole, which are longitudinally aligned and randomly stacked and then compressed and bonded together to form a cohesive bamboo composite structure from which beams of a desired dimension may be cut. Strength consistency is lacking in this bamboo product, however.

Fujii, et al. has been issued U.S. Pat. Nos. 5,741,589 and 6,010,585. These patents are directed to construction materials made of a woody group material consisting of finely split pieces of wood, bamboo or the like and cement. U.S. Pat. No. 7,276,551 to Pageau discloses a cement composition including wood fibers and wood shavings.

U.S. Pat. No. 5,573,348 to Morgan discloses structural members formed of cement-based slurry infiltrated fiber composite material, FIG. 6 of which is referred to as a railroad tie. Leon teaches structural members fabricated of wood products and thermoplastics products in U.S. Pat. No. 7,172,136. Thomas, et al. teaches a cementitious composite of cellulosic debris and Portland cement in U.S. Pat. No. 5,196,061.

A process for making a cement mixture containing fibers is disclosed in U.S. Pat. No. 5,167,710 to Leroux, et al. and a method for constructing buildings using fiber-reinforced cellular concrete products is taught in U.S. Pat. No. 6,976,345 to Keshmiri. Hayakawa, et al. teaches a cement composition having pulp fiber in U.S. Pat. No. 5,047,086.

Friberg discloses cementuous fiber impregnated construction compositions and a process therefor in U.S. Pat. No. 4,799,961 and Sattler, et al. teaches construction materials in which fibers of ligno-celluloses and Portland cement are utilized. Bayasi teaches recycled fiber reinforced, moldable cementitious compositions in U.S. Pat. No. 5,733,671.

U.S. Pat. No. 4,985,119 to Vinson, et al. teaches cellulose fiber-reinforced construction materials for building and construction and Creamer, et al. discloses fiber reinforced aerated concrete compositions in U.S. Pat. No. 6,773,500. Finally, Merkley, et al. teaches fiber cement composite materials and discloses fiber treatment, formulation, method and final construction product in U.S. Pat. No. 6,872,246.

A previous invention also utilizes bamboo segments in a unique way to develop an even stronger bamboo beam structure for use in the building industry. The process of compressing and final beam formation is taught by Trautner in U.S. Pat. No. 3,723,230, the teaching of which is incorporated herein by reference. Trautner teaches a continuous press for pressing glue-coated consolidatable press charges into structural composite wood structural components.

A significant aspect of the previous invention, as with this continuing disclosure, is the recognition that bamboo segments may only be securely glued into a cohesive bamboo composite structure after the outer epidermis surface material and nodes have been machined, abraded or otherwise stripped therefrom. Current glue technology is somewhat inadequate in its binding effect with a bamboo surface which still retains any portion of the epidermis husk or inner membrane material prior to the drying and bonding of the bamboo segments as will be more described more completely herebelow.

BRIEF SUMMARY OF THE INVENTION

This invention is directed to a composite cured concrete core and bamboo outer-layered structural member and process of manufacture therefor. The core of cured and hardened concrete is preferably aerated, autoclaved concrete. The bamboo material includes a plurality of layers each formed of bamboo segments which have been dried and glue coated. The segments are substantially free of outer nodes and husk and inner membrane material prior to application of glue. The longitudinal axes of the segments in each layer are generally parallel to one another, and generally parallel to the length of the cured concrete core. The layers of segments being compressed and bonded together in a mold and surrounding the core until the glue cures into a single integral structure and with improved physical properties.

A composite concrete/bamboo structural member is provided which includes an elongated core formed of cured concrete and a bamboo layer surrounding the core and positioned against all longitudinally extending surfaces of the core. The bamboo layer is formed of a plurality of elongated bamboo segments, each of which is formed of dried and glue coated elongated bamboo strands formed by splitting each of the segments only along natural fiber boundaries to preserve material bamboo fiber strength. The segments being completely free of outer nodes and husk and inner membrane material prior to application of glue. These segments, after the glue is applied, are re-dried preferably to a moisture content of between about 1% to 10%, and compacted under pressure against the core, and then heated and bonded together to form a single integral structure.

Viewed another way, the composite and bamboo structural member is formed by the process of:

a. splitting bamboo tubes lengthwise into halves entirely along natural uncut bamboo fiber boundaries wherein all of the material bamboo fiber strength is preserved;
b. flattening the halves into partially separated slats each having an outer and an inner surface;
c. removing nodes and husk or epidermis from the outer surface of each slat and inner membrane or epidermis material from the inner surface of each slat;
d. stranding the slats by splitting and separating them along natural bamboo fiber boundaries into thin, flat elongated irregular segments wherein substantially all of the material bamboo fiber strength is preserved;
e. drying the segments;
f. applying a glue coating to the segments;
g. heating an elongated concrete core and placing said core into a mold;
h. arranging the segments into layers surrounding the surface of the core, the segments being oriented generally parallel to one another and extending generally longitudinally to the core; and
i. heating and compressing the layers together while the glue cures into a single bonded integral structure.

More generally, this invention may be viewed as a composite concrete/bamboo structural member including an elongated core formed of cured concrete, a bamboo layer surrounding the core and positioned against all longitudinally extending surfaces of the core. The layer is formed of a plurality of elongated bamboo segments, each of said bamboo segments formed of dried and glue coated elongated bamboo strands formed by splitting each of said segments only along natural fiber boundaries to preserve material bamboo fiber strength, the segments being completely free of outer nodes and husk and inner membrane material prior to application of the glue, the segments having been compacted under pressure against the core, heated and bonded together to form a single integral structure.

It is therefore an object of this invention to provide a composite concrete core and bamboo outer-layered structure for use in the building industry as a substitute for solid wood or composite wood products.

It is another object of this invention to provide composite concrete/bamboo structural members having higher strength ratios than those previously attained.

And another object of this invention is to provide composite beam products formed of bamboo segments in layered array around a cured concrete core which clearly exhibits superior glue-to-bamboo segment adhesion by the prior removal of substantially all epidermis materials from the bamboo segments.

Still another object is to provide an improved railroad tie which is more economical to manufacture from plentiful supply of concrete and bamboo.

In accordance with these and other objects which will become apparent hereinafter, the instant invention will now be described with reference to the accompanying drawings.

BRIEF DESCRIPTION OF THE SEVERAL VIEWS OF THE DRAWING(S)

Figure 1:
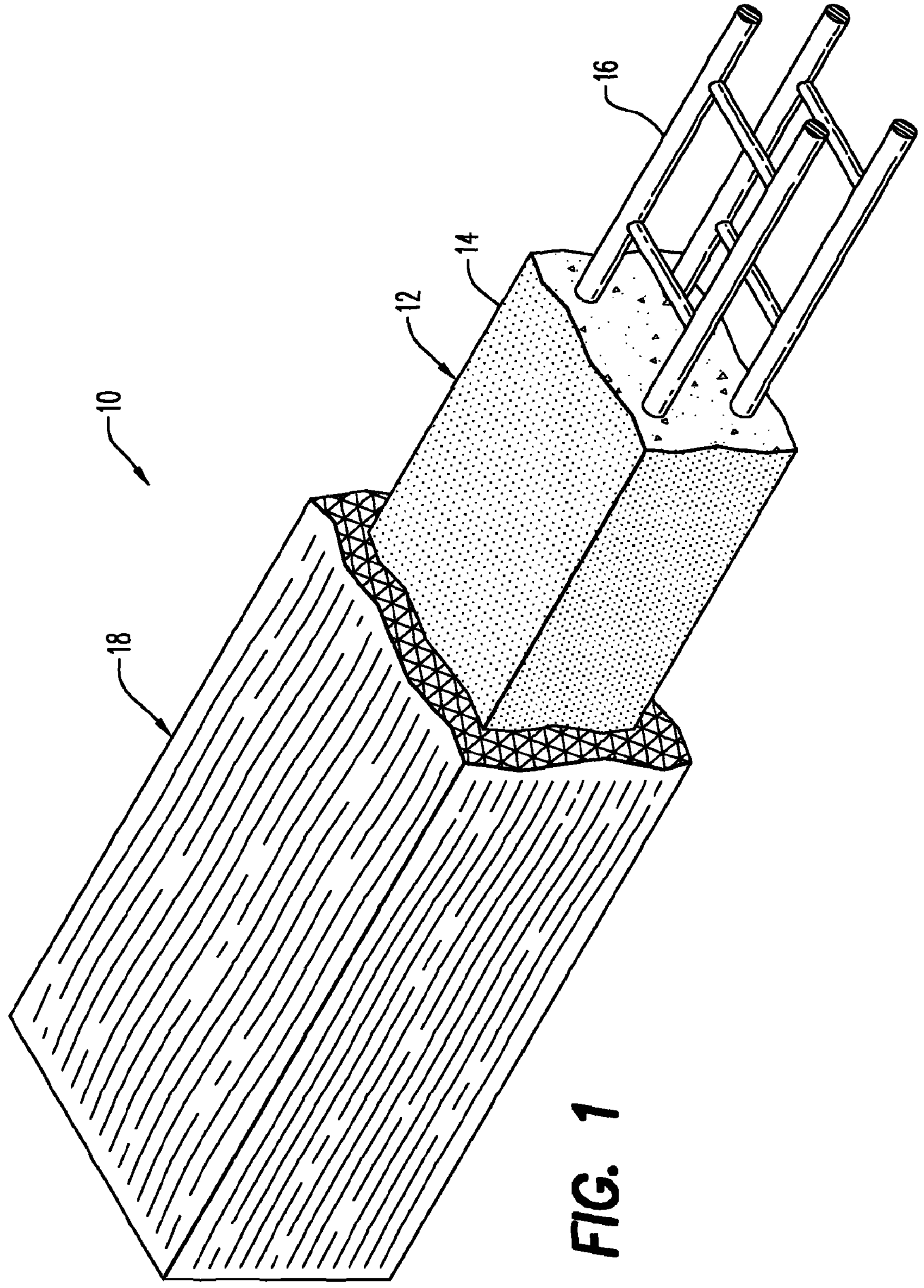
FIG. 1 is a perspective view of the preferred embodiment of the invention.

FIGS. 3A to E are exploded end elevation views of the steps of forming FIG. 1.

Exemplary embodiments are illustrated in reference figures of the drawings. It is intended that the embodiments and figures disclosed herein are to be considered to be illustrative rather than limiting.

DETAILED DESCRIPTION OF THE INVENTION

The Detailed Description and accompanying Figures set forth in pending US 2008/0023868 are hereby incorporated and reproduced herein by reference.

Referring now to the drawings, and firstly to FIG. 1, the preferred embodiment of the invention is there shown generally at numeral 10 and includes a reinforced concrete core 12 of a structural member 18 formed, as will be described more fully herebelow, of aerated, autoclaved concrete, THERMA-CELL concrete, or any aggregate-free concrete. The steel reinforcement 16 in the form of REBAR rods set longitudinally into, and coextensive with, the cured concrete 14 is preferred for added strength, particularly where heavier beam loading is anticipated, such as when used as a railroad tie.

Figure 2:
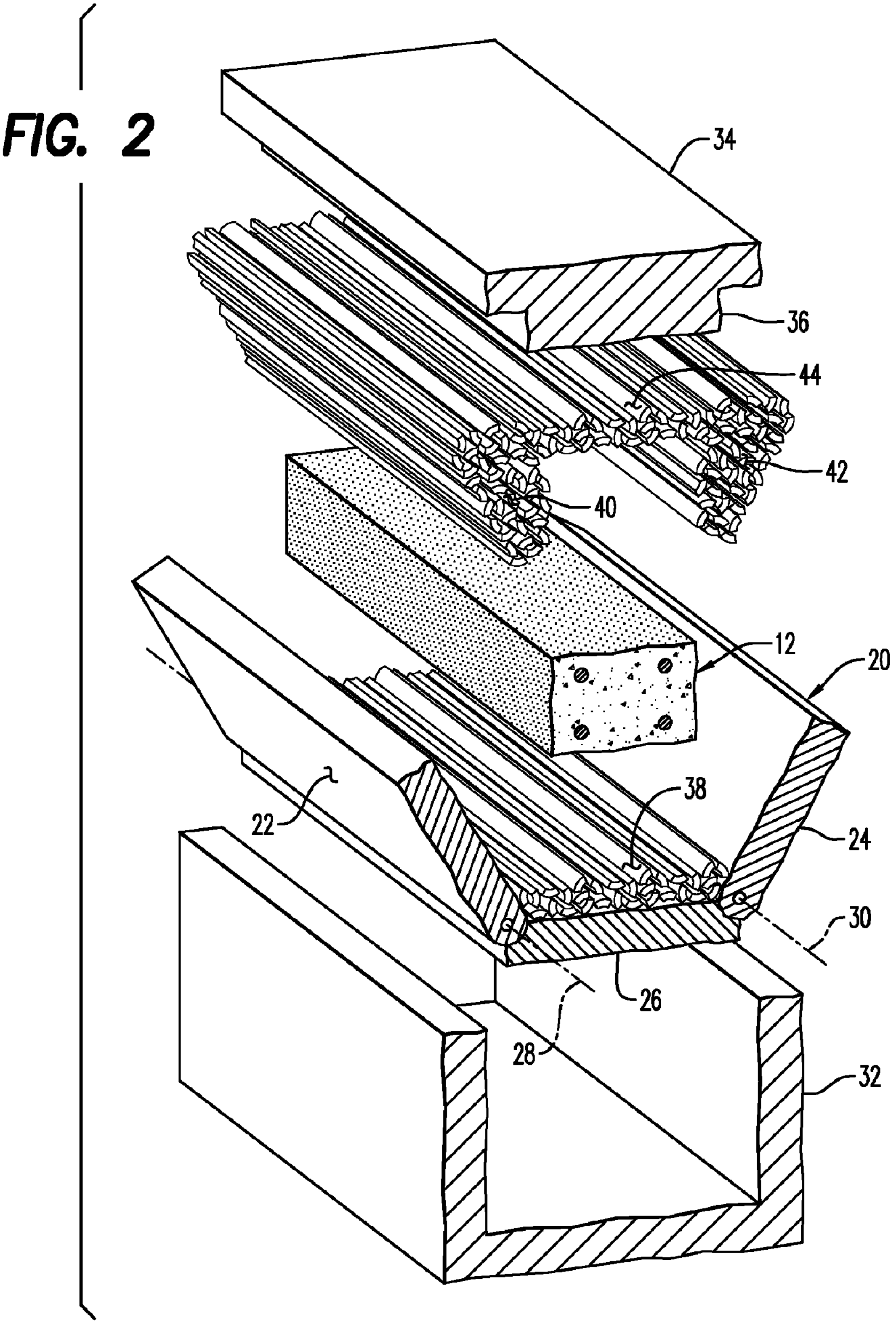
FIG. 2 is an exploded perspective view of FIG. 1 in relation to a mold assembly.

Referring now the remainder of the figures, a rigid mold receiver 32 is provided for receiving the articulating mold base 20 which includes side panels 22 and 24 hingedly connected along pivotal axes 28 and 32 to either edge of a flat bottom panel 26. Initially, the concrete core 12 is cast, again preferably with REBAR reinforcement 16. Each of the concrete cores 12, again preferably formed of aerated, autoclaved concrete, is either preferably heated before being introduced into the molding process starting at FIG. 2, or is used immediately after being removed from the furnace within which the concrete core has been cured and hardened.

Figure 3A:
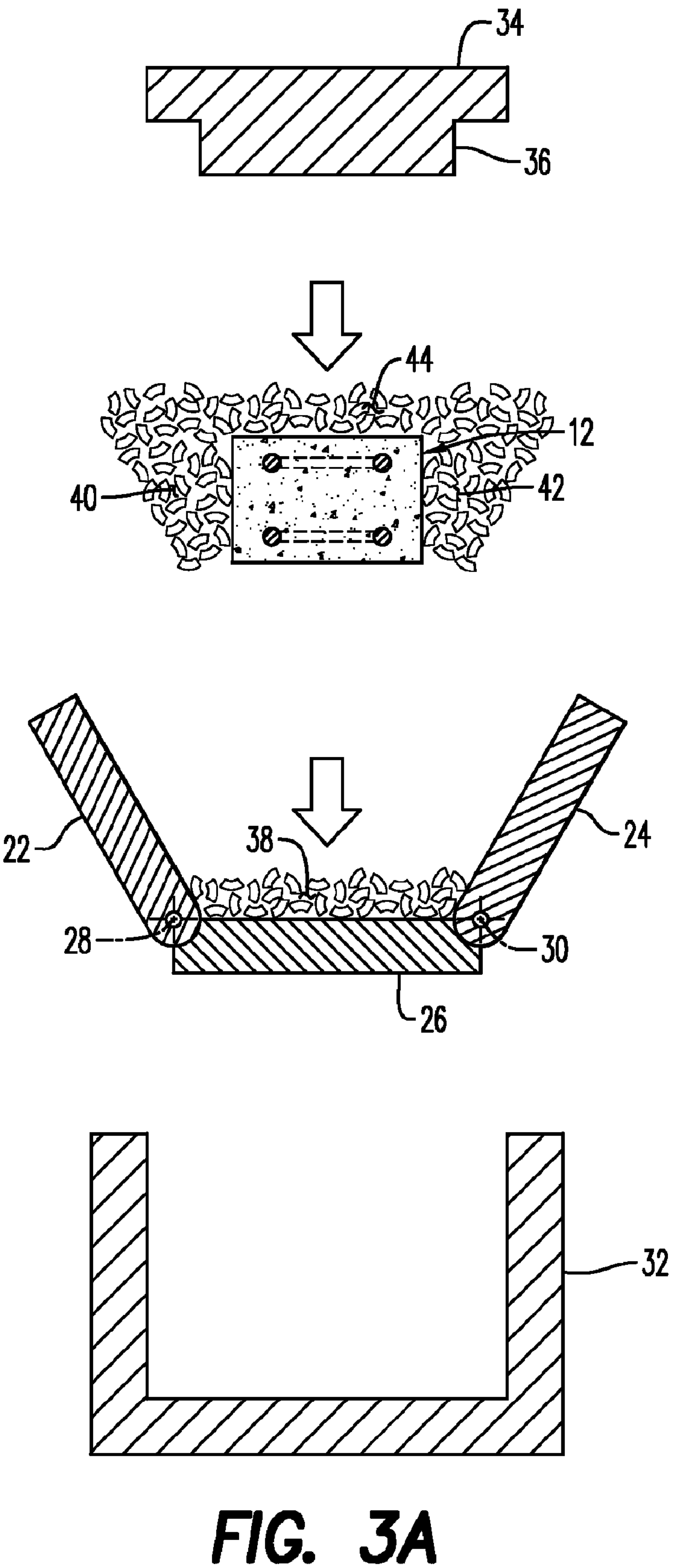
Figure 3B:
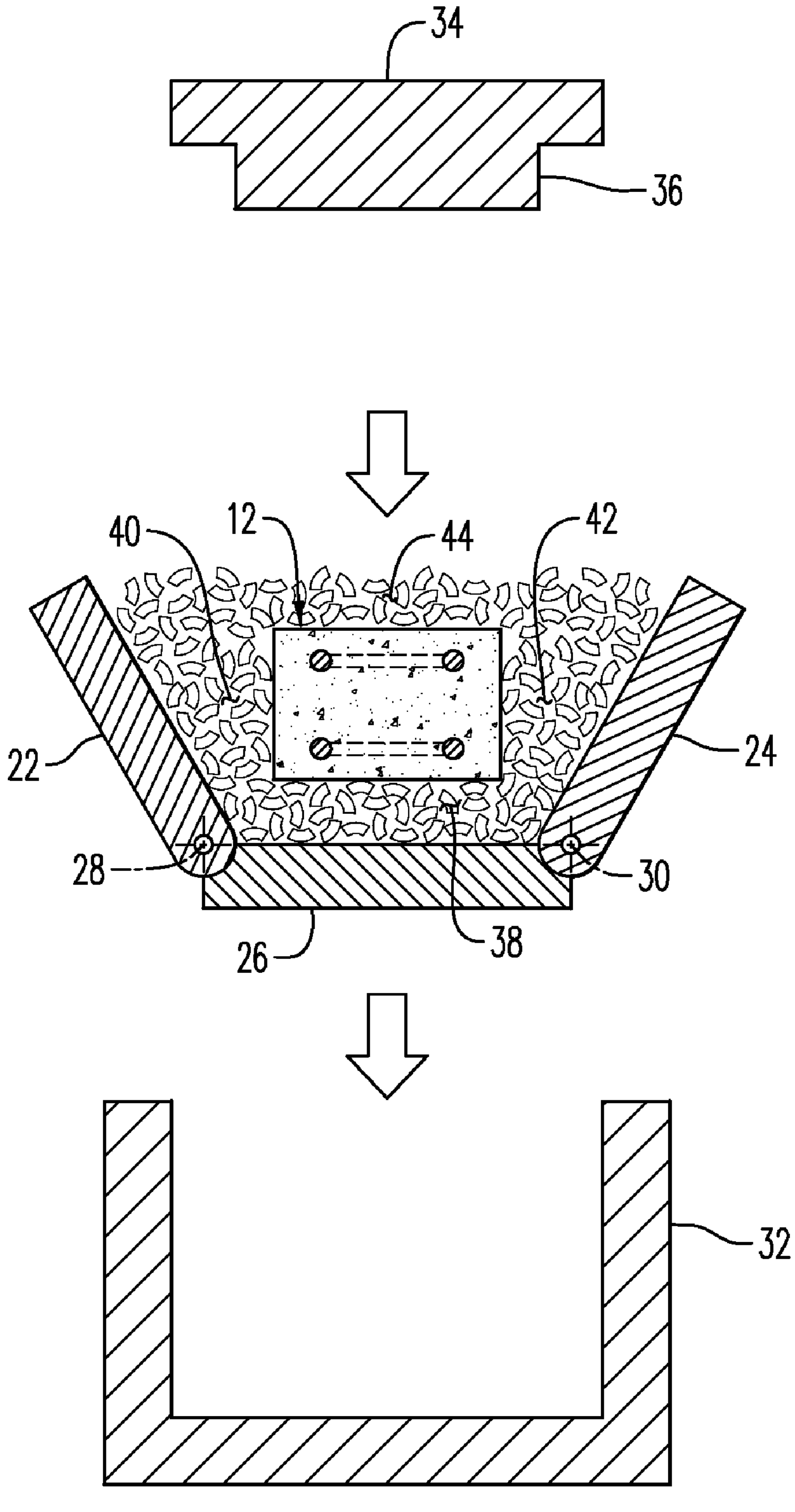
Figure 3C:
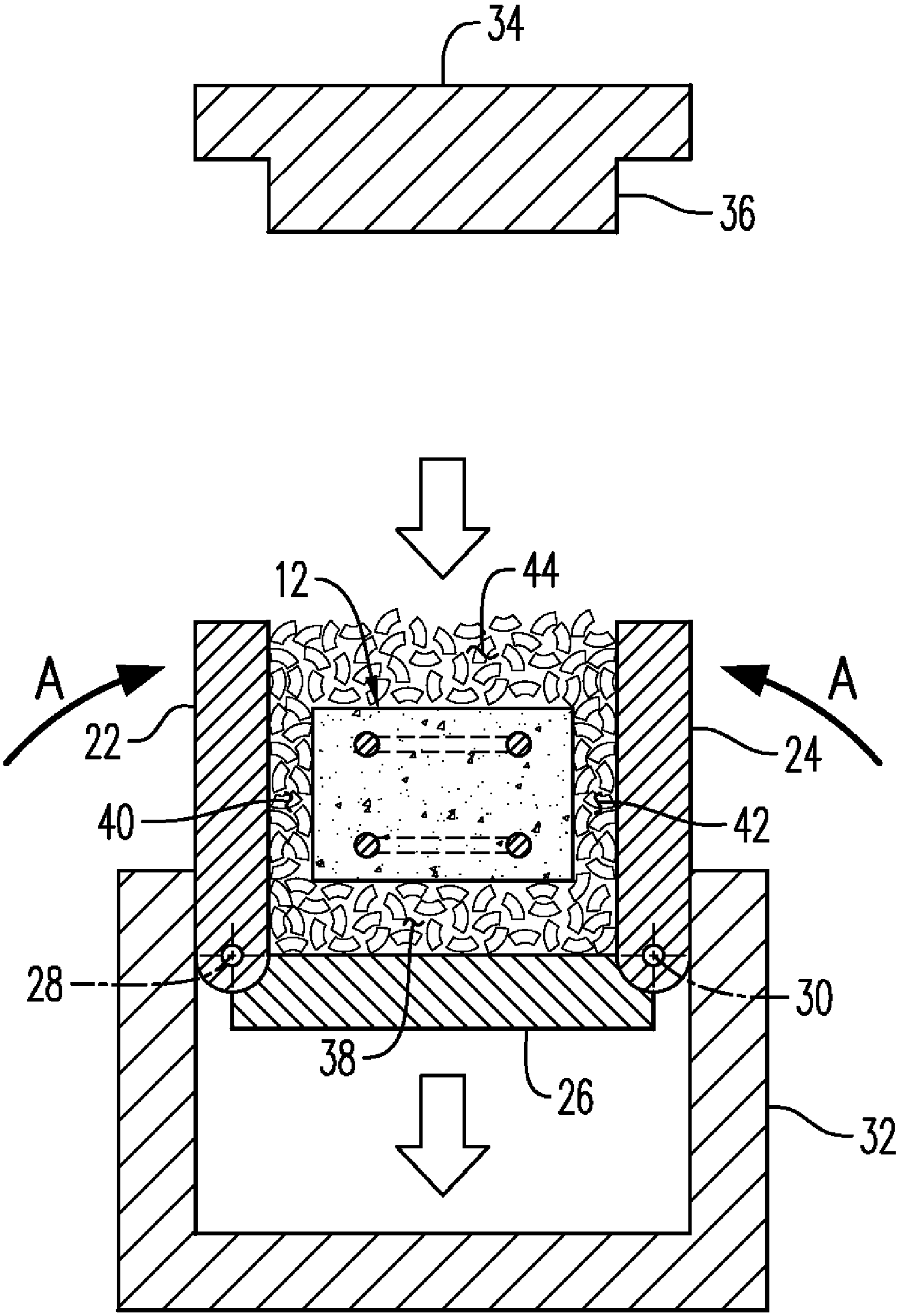

The manufacturing process of each of the beams 10 is commenced by placing a loose uniform thickness layer of bamboo segments 38 atop the lower panel 26 of the articulating mold 20. These segments 38 have been prepared in accordance with the above-referenced teachings, again, incorporated herein by reference. The cured concrete core 12 is then placed atop these strands 38, after which loose bundles of bamboo strands 40 and 42 are positioned along either side of the concrete core 12 and then atop the concrete core 12 at 44. Finally, a mold top 34 is positioned downwardly atop the upper layer 44 of bamboo strands after the pivotal side panels 22 and 24 are moved into an upright orientation in the direction of arrow A about pivotal axes 28 and 30 as seen in FIG. 3C.

Figure 3D:
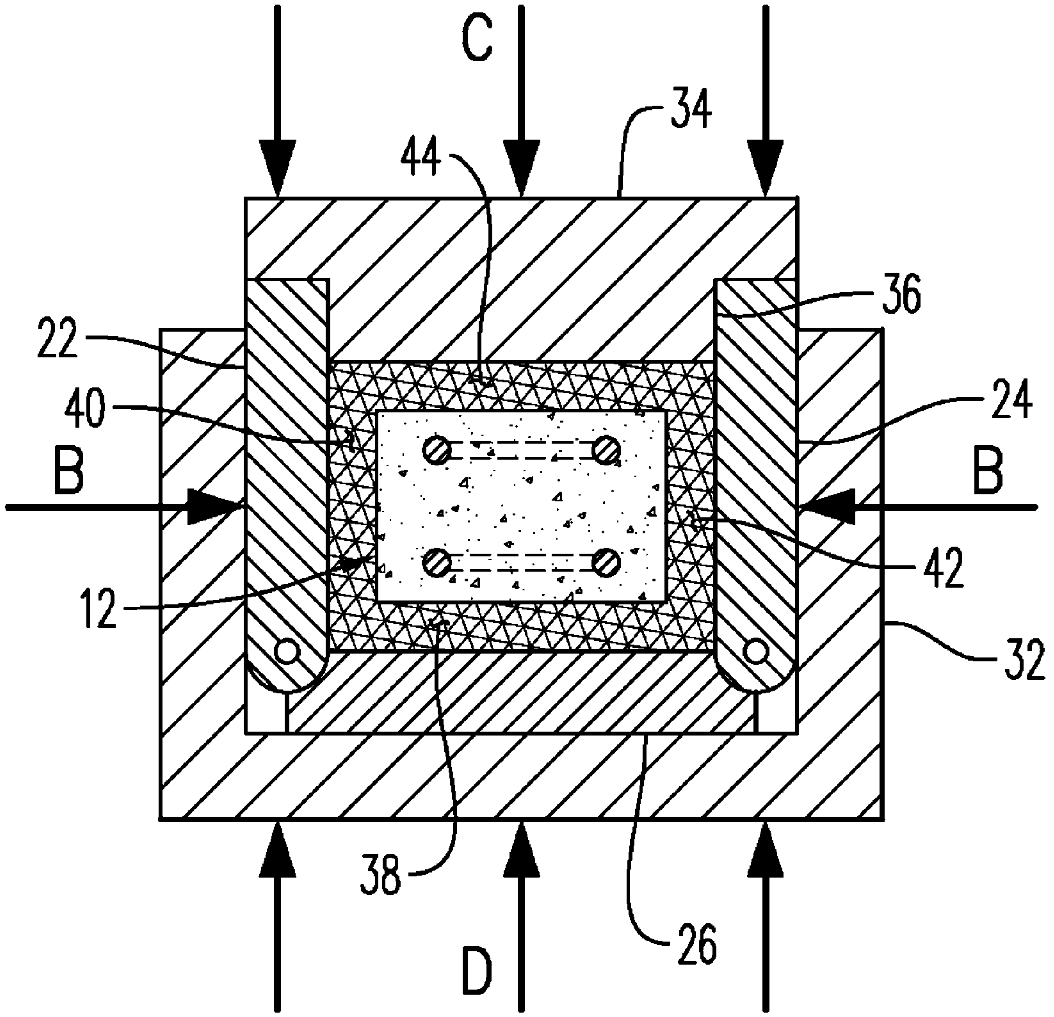

As seen in FIG. 3D, pressure is exerted laterally inwardly in the direction of arrows B against the side panels 22 and 24 by the upright sides of the mold receiver 32 as the mold top 34 is urged downwardly in the direction of arrow C such that notches 36 engage with the upper margins of the pivotal side panels 22 and 24.

To cure and solidify the loose bamboo strands 38, 40, 42 and 44 into a solid, substantially homogenous layering surrounding the concrete core 12, both pressure and heat must be applied. The pressure is obtained by downwardly urging the mold top 34 in the direction of arrow C. Conventional press equipment may be utilized for this purpose, a platen supporting the bottom of the mold receiver 32 in the direction of arrows E. The heat source may be provided by placing the entire arrangement into a furnace and heating the entire contents within the mold receiver 32 to a temperature of approximately 700° centigrade. To accelerate the curing of the glue/bamboo strand mixture, the concrete core 12 may be either preheated or used directly from the curing furnace to provide a heat source radiating therefrom into the bamboo strands to accelerate this curing procedure.

Figure 3E:
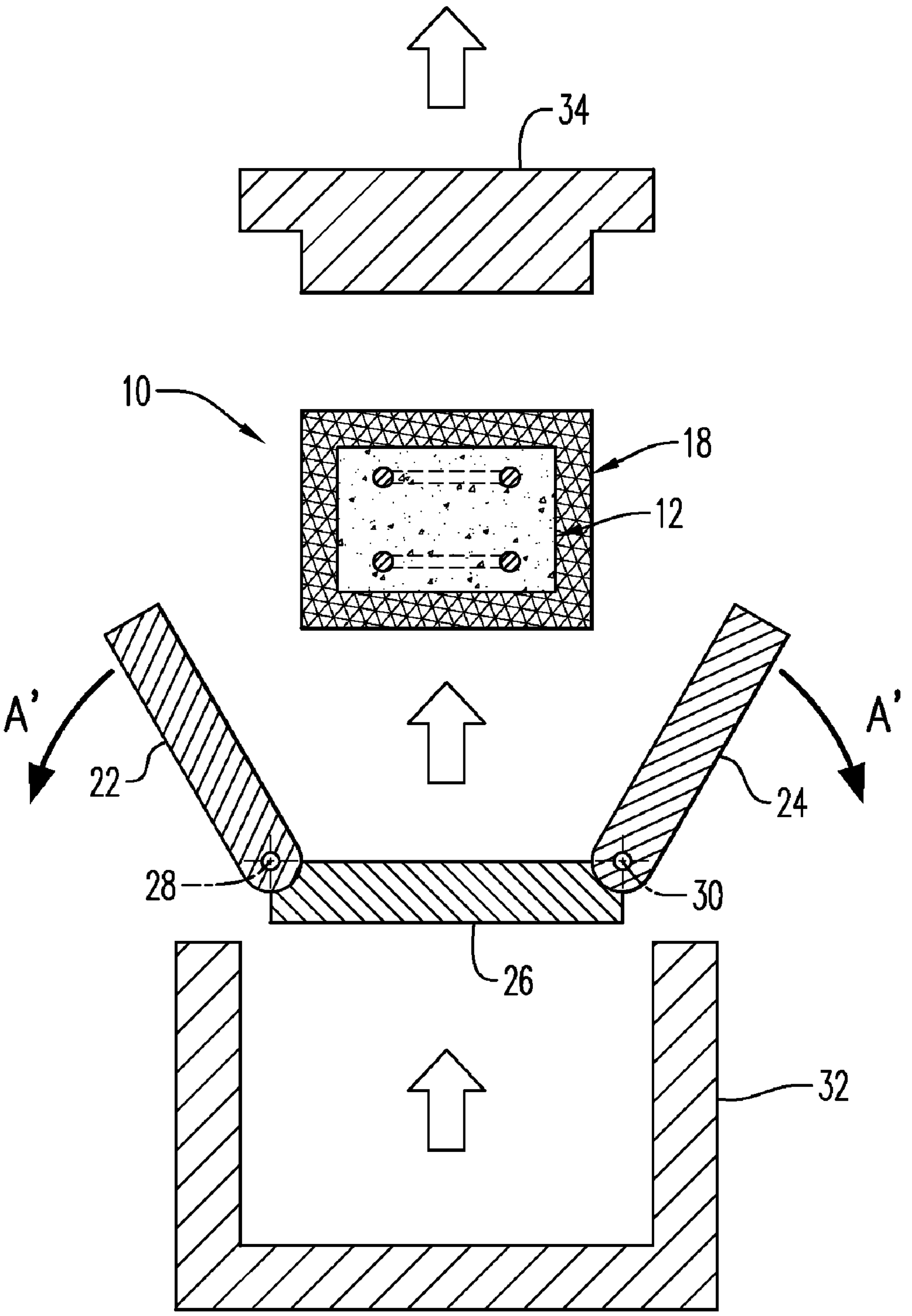

As seen in FIG. 3E, once the temperature and pressure curing process has solidified the composite structural member 18 into a cured ready-to-use beam, the articulated mold base is removed upwardly in the direction of the arrows from the mold receiver 32, the beam 10 is removed therefrom and the mold top 34 is also removed.

Autoclaved Aerated Concrete

Anticipated compressive and modulus values for consolidated engineered structural members formed by this disclosure are as follows: size of 3"×5"×8.2", minimum design compressive strengths from 290-870 psi (approximately 2.0-6.0 MPa); densities ranging from 25 to 50 lbs/ft$^3$ (400-800 kg/m$^3$). Ref. International Building Lime Symposium 2005 Autoclaved Aerated Concrete: A Lime-Based Technology* By Ronald E. Barnett, P.E.

Glue Coated Compressed Bamboo Strands

These layers have a 2" constant thickness surrounding concrete core on all six sides. Test results documenting both flatwise bending and edgewise bending strengths as follows.

1) Average Density of 70.8 (lb/ft$^3$)

(2) Flatwise Modulus of Elasticity (MOE) 1,904,500 (psi)

(3) Edgewise MOE 3,956,598 (psi)

(4) Janka surface hardness of 3,747 (lbs)

(5) Prefer moisture content (preferred) of between 1% and 10%

Projected Values of Consolidated Material into One Structural Unit

Because the structural member has six sides (a top, bottom, two sides and two ends), the test data would apply accordingly. Estimated weight would be 150-175 lbs.

MOE (1) The two sides (being edgewise) would have a combined MOE of 7.9×10$^6$ psi.

(2) The top and bottom (being flatwise) would have a combined MOE of 3.8×10$^6$ psi.

(3) The two ends (being edgewise) would have a combined MOE of 7.9×10$^6$ psi.

Density and Hardness (1) All sides would have a minimum average density of 70.8 (lb/ft$^3$)

(2) All sides would have Janka surface hardness of 3,747 (pounds force)

Values given on compressed bamboo strand material from TECO test laboratory in Eugene Oreg. project control number 08-P-0016.

Comparison to Red Oak

For comparison, compressive and modulus values for a structural member of solid southern red oak of the same finished dimensions are as follows:

(1) Density 58.6 lb/ft$^3$ (2) MOE 1.0×10$^6$ psi (3) Janka surface hardness of 792 (lbs)

Values given on Southern Red Oak from, *The Tie Guide: Handbook for Commercial Timbers used by the Crosstie Industry.*

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A composite concrete/bamboo structural member comprising:

an elongated core formed of cured concrete;

a bamboo layer surrounding said core and positioned against all longitudinally extending surfaces of said core;

said layer formed of a plurality of elongated bamboo segments, each of said bamboo segments formed of dried and glue coated elongated bamboo strands formed by splitting each of said segments only along natural fiber boundaries to preserve material bamboo fiber strength, said segments being completely free of outer nodes and husk and inner membrane material prior to application of said glue, said segments, after the glue is applied, being re-dried to a moisture content of between about 1% to 10%, said segments being compacted under pressure against said core, heated and bonded together to form a single integral structure.

2. A composite and bamboo structural member formed by the process comprising the steps of:

splitting bamboo tubes lengthwise into halves entirely along natural uncut bamboo fiber boundaries wherein all of the material bamboo fiber strength is preserved;

flattening said halves into partially separated slats each having an outer and an inner surface;

removing nodes and husk or epidermis from said outer surface of each said slat and inner membrane or epidermis material from said inner surface of each said slat;

stranding said slats by splitting and separating them along natural bamboo fiber boundaries into thin, flat elongated irregular segments wherein substantially all of the material bamboo fiber strength is preserved;

drying said segments;

applying a glue coating to said segments;

heating an elongated concrete core and placing said core into a mold;

arranging said segments into layers surrounding the surface of said core;

said segments oriented generally parallel to one another and extending generally longitudinally to said core;

heating and compressing said layers together while said glue cures into a single bonded integral structure.

3. A composite concrete/bamboo structural member comprising:

an elongated core formed of cured concrete;

a bamboo layer surrounding said core and positioned against all longitudinally extending surfaces of said core;

said layer formed of a plurality of elongated bamboo segments, each of said bamboo segments formed of dried and glue coated elongated bamboo strands formed by splitting each of said segments only along natural fiber boundaries to preserve material bamboo fiber strength, said segments being completely free of outer nodes and husk and inner membrane material prior to application of said glue, said segments being compacted under pressure against said core, heated and bonded together to form a single integral structure.

* * * * *